United States Patent
Chakraborty et al.

(10) Patent No.: US 10,467,988 B2
(45) Date of Patent: Nov. 5, 2019

(54) AMALGAMATED ALPHANUMERIC CHARACTER DISPLAY SYSTEM AND METHOD

(71) Applicant: ROCKWELL AUTOMATION ASIA PACIFIC BUSINESS CENTER PTE. LTD., Singapore (SG)

(72) Inventors: Rajiv Shyamalendu Chakraborty, Singapore (SG); Hon chung Chai, Singapore (SG); Kan Yen Cheong, Singapore (SG); Kevin Huan Hong Lee, Singapore (SG); Thomas Kazushige Sugimoto, Singapore (SG); Chenghao Sun, Singapore (SG); Bing Yan, Singapore (SG)

(73) Assignee: Rockwell Automation Asia Pacific Business Center Pte. Ltd., Singapore (SG)

( * ) Notice: Subject to any disclaimer, the term of this patent is extended or adjusted under 35 U.S.C. 154(b) by 558 days.

(21) Appl. No.: 14/631,269

(22) Filed: Feb. 25, 2015

(65) Prior Publication Data

US 2016/0247486 A1    Aug. 25, 2016

(51) Int. Cl.
*G09G 5/24* (2006.01)
*G06F 3/0484* (2013.01)
(Continued)

(52) U.S. Cl.
CPC ........... *G09G 5/24* (2013.01); *G05B 19/0426* (2013.01); *G06F 3/04842* (2013.01);
(Continued)

(58) Field of Classification Search
CPC ........ G06F 3/1446; G06F 3/147; G06F 3/041; G09F 9/33; G09G 3/30; G09G 3/3611; G09G 3/32; G09G 5/00
See application file for complete search history.

(56) References Cited

U.S. PATENT DOCUMENTS

| | | | | |
|---|---|---|---|---|
| 4,462,026 A | * | 7/1984 | Munday | G09G 3/04 345/204 |
| 6,100,858 A | * | 8/2000 | Tran | G09G 3/04 345/33 |

(Continued)

FOREIGN PATENT DOCUMENTS

| | | |
|---|---|---|
| CN | 102419559 A | 4/2012 |
| CN | 2012145267 U | 4/2012 |

(Continued)

OTHER PUBLICATIONS

Extended EP Search Report for EP Application No. 16157074 dated Jun. 21, 2016; 9 Pages.

(Continued)

*Primary Examiner* — Sang H Kim
(74) *Attorney, Agent, or Firm* — Fletcher Yoder, P.C.

(57) ABSTRACT

An automation component includes a display having addressable locations in an array for display of data, and control circuitry that is configured to control the display. In a first mode, the control circuitry controls illumination of one or more individual locations of the display in the array for conveying individual data corresponding to the individual locations. In a second mode, the control circuitry controls illumination of two or more individual locations in the array to display an amalgamated alphanumeric character.

19 Claims, 4 Drawing Sheets

(51) Int. Cl.
*G09G 5/10* (2006.01)
*G09G 5/30* (2006.01)
*G05B 19/042* (2006.01)
*G09G 3/34* (2006.01)

(52) U.S. Cl.
CPC ....... *G06F 3/04847* (2013.01); *G09G 3/3426* (2013.01); *G09G 5/30* (2013.01); *G09G 2320/0686* (2013.01); *G09G 2380/06* (2013.01)

(56) References Cited

U.S. PATENT DOCUMENTS

| | | | | |
|---|---|---|---|---|
| 6,150,996 | A * | 11/2000 | Nicholson | G09F 9/33 345/1.3 |
| 7,312,773 | B1 * | 12/2007 | Herzen | G09G 5/346 345/39 |
| 2008/0225039 | A1 | 9/2008 | Oshita et al. | |
| 2009/0276096 | A1 | 11/2009 | Proffitt et al. | |
| 2012/0044082 | A1 * | 2/2012 | Molnar | H05K 7/1469 340/687 |
| 2012/0047288 | A1 * | 2/2012 | Kretschmann | H05K 7/1468 710/8 |
| 2012/0133303 | A1 * | 5/2012 | Campbell | H04W 4/04 315/312 |
| 2014/0191977 | A1 * | 7/2014 | Feng | G06F 3/018 345/173 |
| 2016/0019831 | A1 * | 1/2016 | Hall | G09G 3/3208 345/212 |

FOREIGN PATENT DOCUMENTS

| | | |
|---|---|---|
| CN | 103019125 A | 4/2013 |
| DE | 29712772 U1 | 11/1997 |

OTHER PUBLICATIONS

Search Report in CN201610101444.3 dated Jan. 3, 2018 with English translation, 11 pages.
Office Action for CN Application No. 201610101444.3 dated Jul. 12, 2018, with English translation, 13 pages.

* cited by examiner

AMALGAMATED ALPHANUMERIC CHARACTER DISPLAY SYSTEM AND METHOD

BACKGROUND

The present disclosure relates generally to automation devices, such as controllers, and, more particularly, to a systems and methods for displaying amalgamated characters using an array of addresses on the display of an automation device.

Automation devices, such as programmable automation controllers, are often utilized in industrial systems to control and make operational decisions for the systems with which the automation devices are connected. For example, such automation controllers are typically made up of several components, examples of which may include a processor, memory, input/output assemblies, a power supply, or a display. To communicate with the other automation components in the system, the internet protocol (IP) or other network address of the automation controller must be set by a user. Typically, setting the network address requires connecting the automation device to a laptop or other tool, such as a smart device or human interface module (HIM), and the like. It would be beneficial to have a way to set the IP address of an automation device without having to connect a laptop or other tool.

BRIEF DESCRIPTION

Certain embodiments commensurate of the presently contemplated technologies are summarized below. These embodiments are not intended to limit the scope of the claimed invention, but rather these embodiments are intended only to provide a brief summary of possible forms of the technologies. Indeed, the disclosure may encompass a variety of forms that may be similar to or different from the embodiments set forth below.

In a first embodiment, an automation component includes a display having addressable locations in an array for display of data, and control circuitry that is configured to control the display. In a first mode, the control circuitry controls illumination of one or more individual locations of the display in the array for conveying individual data corresponding to the individual locations. In a second mode, the control circuitry controls illumination of two or more individual locations in the array to display an amalgamated alphanumeric character.

In a second embodiment, an automation component includes an automation controller, a display device communicatively coupled to the automation controller and having addressable locations in an array for display of data, and control circuitry. The control circuitry is configured to control the display. In a first mode, the control circuitry controls illumination of one or more individual locations of the display in the array for conveying individual data corresponding to the individual locations and indicative of status of a corresponding input, output, or automation component in communication with the automation controller. In a second mode, the control circuitry controls illumination of two or more individual locations in the array to display an amalgamated alphanumeric character.

In a third embodiment, a method of controlling an automation component includes illuminating one or more individual locations, in a normal operation mode, such that the one or more individual locations convey individual data corresponding to the individual locations, selecting, via a user interface, a program mode, selecting, via the user interface, an input mode, illuminating two or more individual locations to display an amalgamated alphanumeric character, selecting, via the user interface, one or more numbers that correspond to the amalgamated alphanumeric character, exiting, via the user interface, the input mode.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Setting the network address of an automation component typically requires connecting a laptop, smart device, HIM, or other tool to the automation component. It would be beneficial to give the user the capability of setting the network address of an automation component without the use of extra equipment. However, modifying the display device of an automation component to mimic the features of a laptop or other similar tool (i.e., LCD screen, keypad or touchscreen, user interface, etc.) could significantly increase the cost of the display device. Accordingly, it would be desirable to have an automation component display device that allows the user to set the network address of the automation device, but is not substantially more expensive than currently available display devices.

It should be noted that certain references are made in the following discussion to setting an address, typically a network address of an automation device. The present techniques, however, are not limited to such applications, but may be used any time a more limited, addressable display is repurposed from indication data, such as status data in an array to the use of "amalgamated" characters by appropriate addressing of the character locations. The term "amalgamated" here may refer to a composite character that is made up of locations, typically adjacent locations that are addressed (typically made light or dark), but that otherwise serve other functions, such as for status indication. Further, while reference is made below to IP addresses, any network address may be programmed (or checked) in the ways disclosed. Moreover, while the primary example given in the disclosure is that of an automation controller, in practice the technique is not so limited, but may be used on any automation component that has a display that can be repurposed for display of amalgamated characters as disclosed.

As discussed in detail below, embodiments of the present techniques function to provide a display device for an automation controller with an array of addresses capable of showing the status of inputs, outputs, and/or various connected components in one mode of operation and then illuminating multiple adjacent addresses to display amalgamated alpha-numeric characters in a second mode of operation. The display device may be located locally or remotely from the system in which the automation controller resides. For example, the automation controller may be housed in an enclosure and the display device may be installed in the enclosure's door so that the display device is accessible when the enclosure's door is shut. As another example, the display device may be a stand-alone device that is connected to the automation controller via a cable. The display device may also be a "dumb" device (at least with respect to certain functional aspects) that lacks electronic processing power of its own for performing at least certain tasks and relies on processing from the automation controller to perform such tasks. The display device may include one or more communication interface ports for connection to a personal computer (PC) or other electronic device. It should be noted that the communication interface port may be any protocol capable of communicating with electronic devices but, for purposes of the present discussion, universal serial bus (USB) port will be used as an embodiment of the communication interface port.

Figure 1:
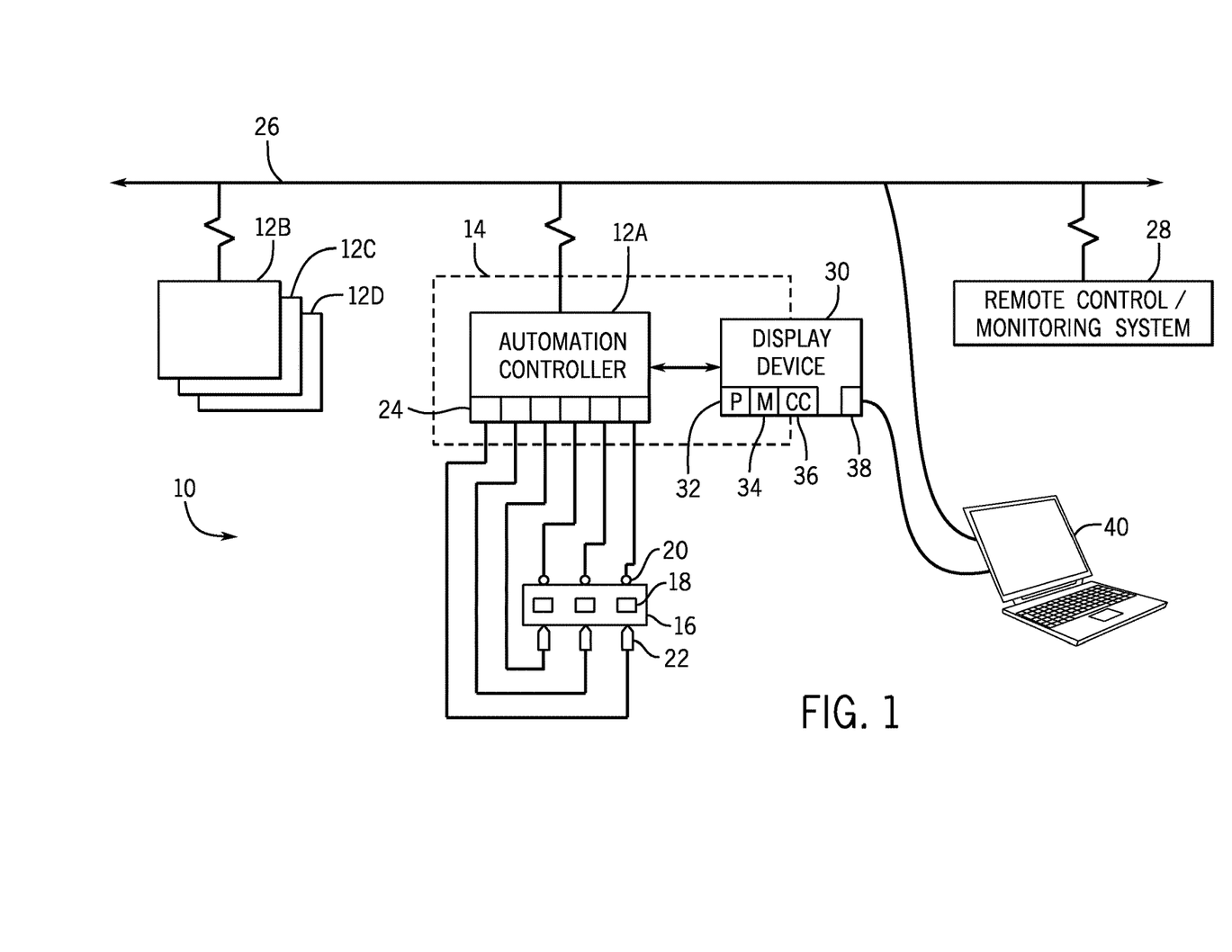
FIG. 1 is a schematic of an exemplary embodiment of an industrial automation and control system in accordance with aspects of the present disclosure.

With the foregoing in mind, an embodiment of an industrial automation and control system 10 in accordance with aspects of the present disclosure is illustrated in FIG. 1 as including an automation component 12A, which here is an automation controller. The system 10 may include other automation components or controllers 12B, 12C, and 12D, which may or may not be disposed within the same or other enclosures, such as electrical cabinets. The enclosure 14 may house a variety of other electrical components, such as monitoring and/or control components, including relays, motor starters, and the like.

The enclosure 14 may be suitable, for example, for assembly of a motor control center or use with industrial, commercial, marine, or other electrical systems. The enclosure 14 may be made of any suitable material, such as heavy gage sheet metal, reinforced plastics, and so forth, in order to protect the housed monitoring and/or control components from various risks, such as damage from fire, water, dust, tampering, and the like. Generally, the enclosure 14 may be any size suitable to satisfactorily house its contents. Thus, the enclosures 14 for industrial systems may be large. Such enclosures 14 may be temperature controlled in order to prevent the monitoring and/or control components from overheating. In certain embodiments, the enclosure 14 includes individual compartments or other structures that support the electrical components.

In the illustrated embodiment, automation controller 12A is disposed within enclosure 14 and adapted to interface with components of a machine process/system 16. It should be noted that such an interface may be facilitated by the use of certain network strategies. Indeed, an industry standard network may be employed to enable data transfer. Such networks permit the exchange of data in accordance with a predefined protocol, and may provide power for operation of networked elements.

The process/system 16 may take many forms and include devices for accomplishing many different and varied purposes. For example, the process/system 16 may comprise a compressor station, an oil refinery, a batch operation for making food items, a mechanized assembly line, and or any other process or system requiring automation. Accordingly, the process/system 16 may comprise a variety of operational components 18, such as electric motors, valves, actuators, temperature elements, pressure sensors, or a myriad of manufacturing, processing, material handling and other applications.

Further, the process/system 16 may comprise control and monitoring equipment for regulating process variables through automation and/or observation. The sensors 20 may comprise any number of devices adapted to provide information regarding process conditions. The actuators 22 may include any number of devices adapted to perform a mechanical action in response to a signal from a controller (e.g., the automation controller 12). The sensors 20 and the actuators 22 may be utilized to operate process equipment. Indeed, they may be utilized within process loops that are monitored and controlled by the automation controller 12. Such a process loop may be activated based on process inputs (e.g., input from a sensor 20) or direct operator input. Additionally, as indicated above, utilizing the actuators 22 and the sensors 20 may be accomplished through direct interaction with the automation controller 12.

As illustrated, these sensors 20 and actuators 22 are in communication with the automation controller 12. In one embodiment, the sensors 20 and actuators 22 may communicate with the automation controller 12 via one or more I/O modules 24 coupled to the automation controller 12. The I/O modules 24 may transfer input and output signals between the automation controller 14 and the controlled process/system 16.

The I/O modules 24 may be integrated with the automation controller 12, or may be added or removed via expansion slots, bays or other suitable mechanism. For example, to add functionality to the automation controller 12, additional I/O modules 24 may be added, such as if new sensors 20 or actuators 22 are added to control the process/system 16. These I/O modules serve as an electrical interface to the automation controller 12 and may be located proximate or remote from the controller including remote network interfaces to associated systems. The automation controller 12 may not require the I/O modules 24 to interact with the controlled and monitored process/system 16. In this situation, the connection between the automation controller 12 and the controlled and monitored process/system 16 may be direct, or it may still occur through the I/O modules 24.

In some embodiments, automation controller 12 is connected to a network 26. The automation controller 12 may communicate with and/or be controlled by a remote control/monitoring system 28 that is also connected to the network 26. The automation controller 12 may receive and activate process loops through the network 26 originating from the remote control/monitoring system 28. In some embodiments, the I/O modules 24 may be located in close proximity to a portion of the control equipment, and away from the automation controller 12. In such embodiments, data is communicated with remote modules over a common communication link, or the network 26, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet. or other network protocols (Foundation Fieldbus (H1 and Fast Ethernet) Modbus TCP, Profibus) and also communicate to higher level computing systems.

In the illustrated embodiment, the system 10 also includes a display device 30, such as an array of LEDs or LCDs, or other addressable display locations configured to display input/output parameters, such as status of the system/process 16, operational components 18, the sensors 20, and/or the actuators 22. In some embodiments, the display device 30 may include a processor 32, memory 34, and/or control circuitry 36. The memory 34 may be a tangible, non-transitory, computer-readable medium, and may include, for example, random-access memory, read-only memory, rewritable memory, hard drives, and the like. The memory 34 may be used to store programs, applications, or other instructions for the processor 32. The memory 34 may also store error codes, login history, access information, look up tables, and the like. The processor 32 may execute programs stored in memory 34 and may be used to display things on the display device, interpret user inputs, etc. The control circuitry 36 may include or be independent of the processor 32 and memory 34. The control circuitry 36 may control what is displayed on the display device, interpret inputs from the user, communicate with the automation controller, etc. The display device may include one or more input keys that enable a user to reprogram the automation controller 12. The display device 30 may be connected to the automation controller 12 via a cable that is plugged into a communication interface port embedded in the automation controller 12 and the display device 30, respectively. In certain embodiments, the display device 30 may be installed in the enclosure 14 and include a port 38 (e.g., USB port) that is embedded in the display device 30. A user may connect a laptop computer 40, or some other tool to the display device 30 through port 38 in order to program the automation controller 12, or perform other tasks, such as running diagnostics or troubleshooting. The laptop 40 may also be connected to the network 26 wirelessly, or through a wired connection.

The port 38 may be installed in the display device's front panel so that it is accessible by a user when the enclosure 14 is closed. Further, the port 38 may specifically include a USB port. It should be noted that "USB" may be an industry standard that defines the cables, connectors, and communication protocols used in a bus for connection, communication, and power supply between computers and electronic devices. By utilizing the port 38, a user may connect a cable between a laptop 40 and the display device 30 in order to reprogram the automation controller 12 or upload an update to it without having to open the enclosure 14.

Figure 2:
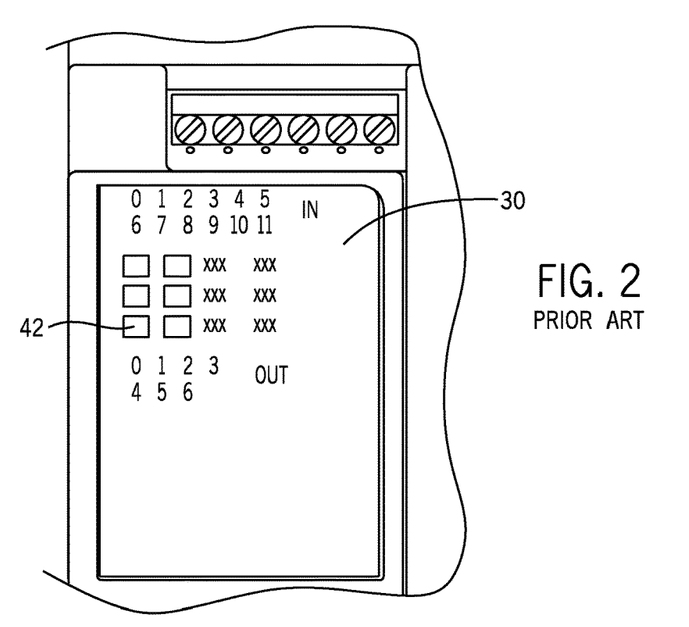
FIG. 2 is a schematic of a prior art embodiment of the display device, as may appear in an industrial automation and control system in accordance with aspects of the present disclosure.

A prior art embodiment of display device 30 is shown in FIG. 2. The prior art embodiment of display device 30 comprises multiple LEDs 42, each signifying an address, configured to indicate the status of inputs/outputs, processes/systems 16, operational components 18, sensors 20, and/or actuators 22, connected to the automation controller 12. The LED 42 may display an amber color to indicate that the component is on and functioning. The LED 42 will remain off to indicate that the connected component is not on and functioning. It should be understood that these are merely examples. In other embodiments the addresses may be other colors and/or be configured to communicate other information. Here again, it should be noted that, while LEDs are referred to here, any suitable addressable display locations may be utilized, including LCDs, both LEDs and LCDs, conventional lights, and so forth.

Figure 3:
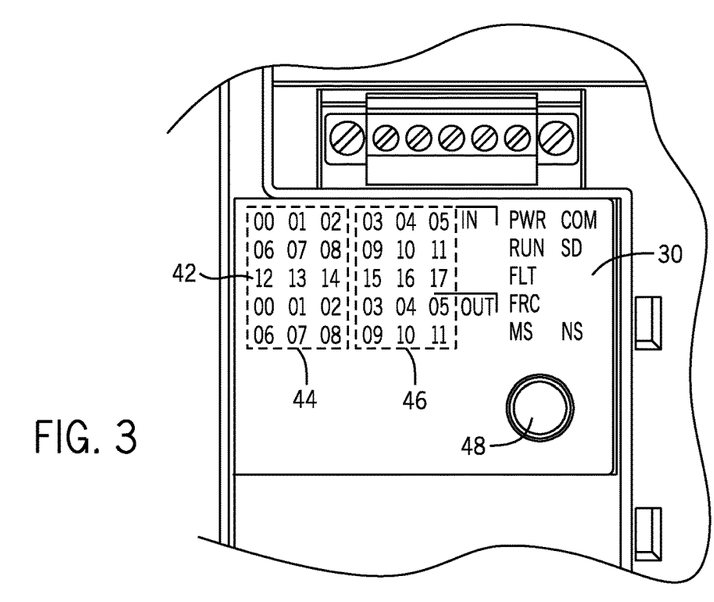
FIG. 3 is a schematic of an embodiment of the display device, as may appear in an industrial automation and control system shown in FIG. 1 in accordance with aspects of the present disclosure.

An embodiment of display device 30 with an LED array configuration is shown in FIG. 3. In the illustrated configuration, the LEDs 42, including inputs and outputs, are organized in two 3×5 arrays 44, 46, each signifying an address. This embodiment may also include a number of other LEDs 42 outside of the two 3×5 arrays 44, 46, used to convey information, such as the status of various components, to the user. The display device 30 may also include one or more input buttons 48, configured to allow the user to input commands. In a normal operating mode, each LED 42 or address communicates the status of a different input/output or component in the system. In program mode, adjacent LEDs 42 or addresses are illuminated to display an amalgamated alphanumeric character that may be used to display a digit of an IP address, an error code, a command code, or some other number. In the present embodiment, the first 3×5 array 44 displays one amalgamated character, while the second 3×5 array 46 displays a second amalgamated character.

Figure 4:
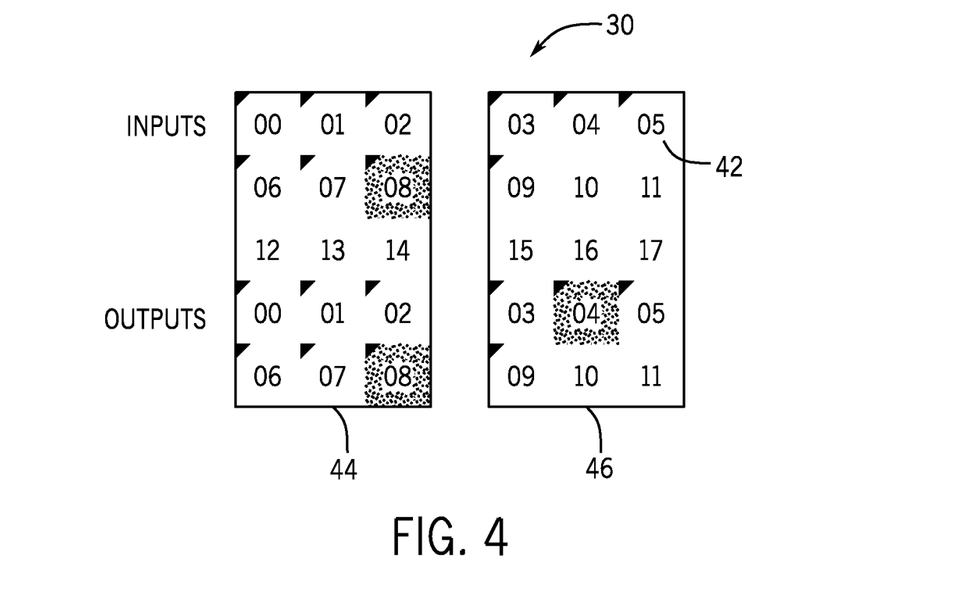
FIG. 4 shows an exemplary embodiment of the display device shown in FIG. 3 having first and second 3×5 arrays of addresses in accordance with aspects of the present disclosure.

FIG. 4 shows the two 3×5 arrays 44, 46 of display device 30 in normal operation mode. In normal operation mode, each LED 42 corresponds to an address and indicates the status of an input/output or connected component (e.g., process/system 16, operational components 18, sensors 20, actuators 22, etc.). In the example shown in FIG. 4, input 08, output 04, and output 08 are on and running, so the corresponding LEDs 42 are illuminated, as indicated by the hatch pattern over each of those addresses. It should be understood that this is merely an example and normal run mode may involve illuminating any combination of the LEDs that correspond to the status of the various components.

Figure 5:
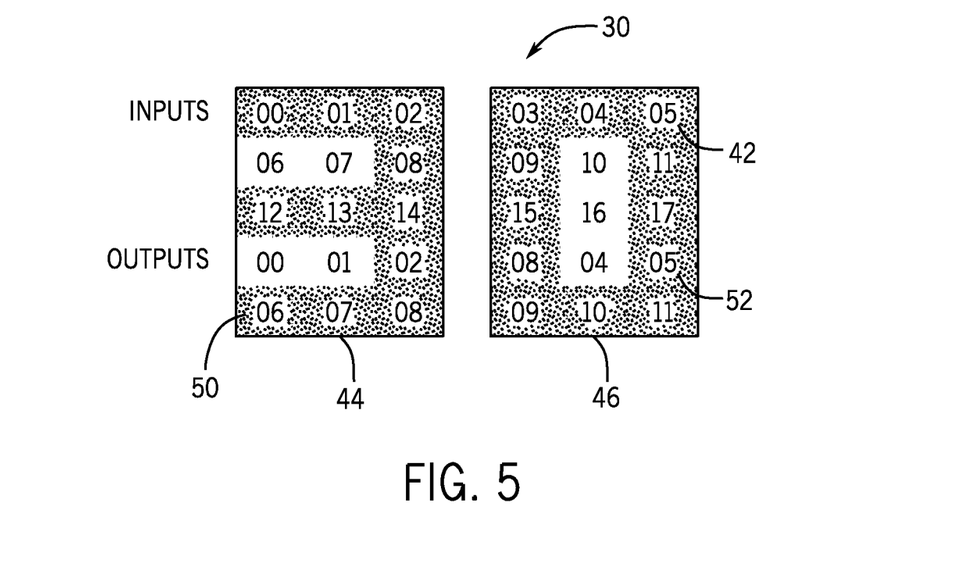
FIG. 5 shows an exemplary embodiment of the display device shown in FIGS. 3 and 4 using first and second 3×5 arrays of addresses to display first and second amalgamated characters in accordance with aspects of the present disclosure.

FIG. 5 shows the two 3×5 arrays 44, 46 of display device 30 in program mode. In program mode, a combination of adjacent LEDs 42 or addresses in the first 3×5 array 44 may be illuminated to show a first amalgamated alphanumeric character 50, in this case, a number three, and a combination of adjacent LEDs 42 or addresses in the second 3×5 array 46 may be illuminated to show a second amalgamated alphanumeric character 52, in this case, a number zero. In the present embodiment, the first and second amalgamated alphanumeric characters 50, 52 correspond to the last two digits of the final octet of the IP address from the automation controller 12. However, in other embodiments, the first and second amalgamated characters 50, 52 could be used to indicate other things, such as error codes, programs, routines, run time, etc. It should also be understood that display device 30 may be capable of digit shifting so that display device 30 may be capable of displaying, or may allow a user to input/set numbers with more than two digits. Furthermore, while the present embodiments include LEDs 42 that illuminate a single color, it should be understood that different colors of LEDs 42 or addresses may be used to signify different things (e.g., IP address, time, component status, errors, problems, etc.).

Figure 6:
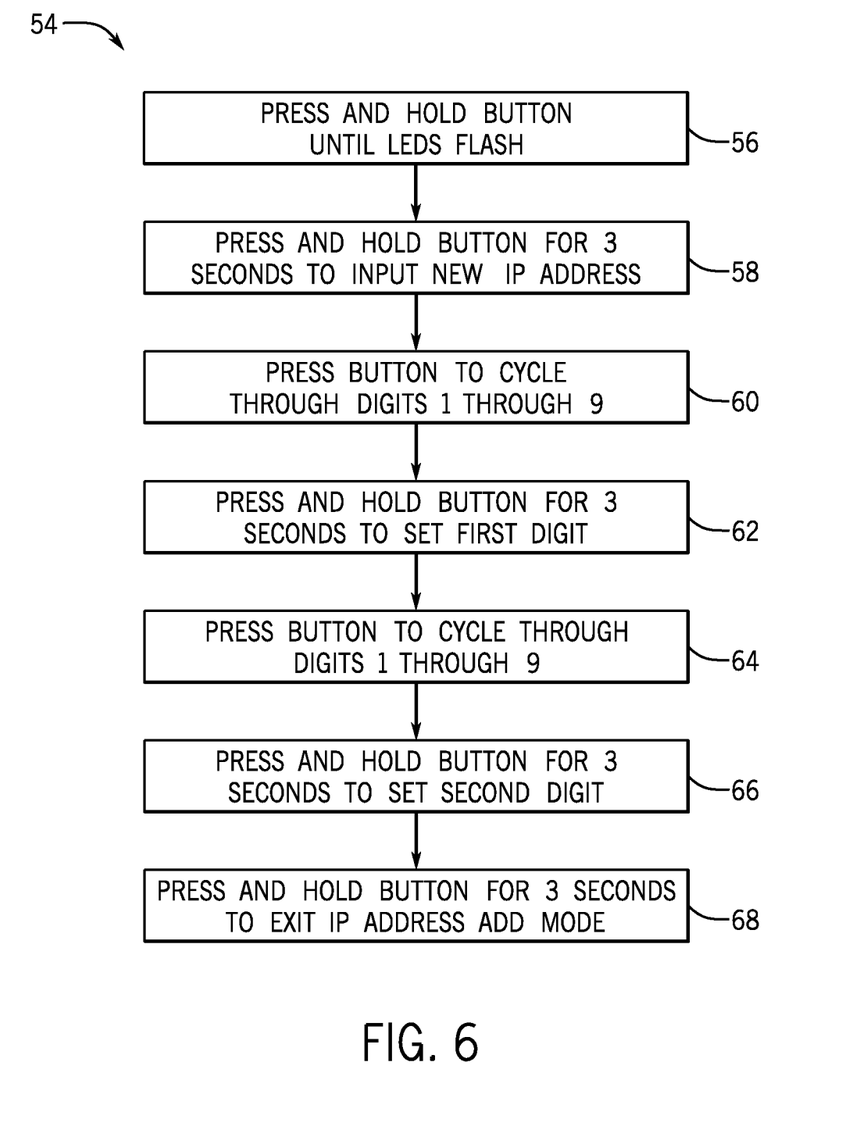
FIG. 6 is a flowchart illustrating a process for setting a network address of an automation component, as may appear in industrial automation and control system shown in FIG. 1, in accordance with aspects of the present disclosure.

FIG. 6. is a flow chart illustrating exemplary logic 54 for setting the IP address of an automation controller 12. It should be understood, however, that the present disclosure is not limited to setting an IP address and that a similar method may be used to input numbers for other purposes, such as command codes, etc. At block 56, the user may press and hold the input button 42 until the LEDs 42 flash. This will move the automation controller 12 from normal operation mode to program mode. Here again, it should be borne in mind that the particular component could be other than an automation controller, and the display could be used for setting or checking data other than network or IP addresses. Still further, it should be noted that while a "button" is referenced here, in practice, the "button" may comprise a location that can be touched or otherwise interfaced by a user, such as for closing or opening a membrane switch or other electrical contact device. The "button" could also comprise a "virtual button" of a touch display, or any other suitable input.

As illustrated at block 58, the user may press and hold the input button 42 for three seconds in order to enter IP address add mode. The first 3×5 array 44 will then display a first amalgamated character 50 of zero.

At block 60 the user then presses the input button 48 to cycle through digits zero through nine. For example, the user would press input button 48 once to change the first amalgamated character 50 to the number one, and once more to change the first amalgamated character 50 to two. The user would continue this pattern until he or she reaches the desired number for the first amalgamated character 50.

At block 62 the user presses and holds the input button 48 for three seconds to set the first digit and move to the second digit. The second 3×5 array 46 will then display a second amalgamated character 52 of zero.

At block 64 the user presses the input button 48 to cycle through digits zero through nine. For example, the user would press input button 48 once to change the second amalgamated character 50 to the number one, and once more to change the second amalgamated character 50 to two. The user would continue this pattern until he or she reaches the desired number for the second amalgamated character 52.

At block 66 the user presses and holds the input button 48 for three seconds to set the digit for the second amalgamated character 52. At this point, the user has input both of the last two digits of the final octet of the desired IP address. It should be understood, however, that in some embodiments the user may be able to enter more than two digits. For example, the user may be able to enter an entire IP address. Furthermore, the user may use a similar method to input command codes, or other codes of two or more digits. Once all digits are set, in block 68, the user presses and holds the input button 48 for three seconds to exit IP address add mode and return to normal operating mode.

Technical effects of the invention include control circuitry configured to control a display device. In a first mode, the display device illuminates one or more individual addresses in an array of addresses, wherein each of the individual addresses communicates information to a user. In a second mode, the display device illuminates two or more adjacent addresses in the array of addresses in order to display a first amalgamated alphanumeric character.

In this example, the user may program (or check) two alphanumeric characters that are amalgamated by addressing adjacent regions of the display under the control of the control circuitry discussed above. In other embodiments, a single such character may be formed, or more than two may be available. Moreover, similar techniques may be used for indicating only the number of amalgamated characters provided, or the user may be able to "scroll through" any number of numbers and/or letters (or other characters) that can be formed and displayed as amalgamated characters (such as for setting longer addresses, programming parameters, settings, and so forth).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An automation component comprising:
a display having addressable locations corresponding to a plurality of inputs and a plurality of outputs arranged in an array for display of data, wherein the array comprises first 3×5 array of locations and a second 3×5 array of locations; and
control circuitry configured to control the display, wherein, in a first mode, the control circuitry controls illumination of a plurality of individual locations of the display in the array, wherein each location conveys individual data indicative of a status of a corresponding connected automation component in communication with an automation controller, and wherein in a second mode, the control circuitry:
controls illumination of the plurality of individual locations in the first 3×5 array to combine a first subset of the plurality of addressable locations to display a first amalgamated alphanumeric character; and
controls illumination of the plurality of individual locations in the second 3×5 array to combine a second subset of the plurality of addressable locations to display a second amalgamated alphanumeric character;
wherein the first and second amalgamated alphanumeric characters correspond to characters of a network address, an internet protocol (IP) address, or an error code.

2. The automation component of claim 1, wherein the control circuitry is configured to receive inputs from a user via one or more input buttons.

3. The automation component of claim 1, wherein the plurality of individual locations comprise LEDs.

4. The automation component of claim 1, wherein the amalgamated alphanumeric character corresponds to the network address.

5. The automation component of claim 1, wherein the amalgamated alphanumeric character corresponds to the error code.

6. The automation component of claim 1, wherein the automation device comprises an electric motor, a valve, an actuator, a temperature element, a pressure sensor, or a combination thereof.

7. The automation component of claim 1, wherein the first and second amalgamated alphanumeric characters correspond to two digits of an IP address.

8. An automation component comprising:
an automation controller;
a display communicatively coupled to the automation controller and having addressable locations corresponding to a plurality of inputs and a plurality of outputs arranged in an array for display of data, wherein the array comprises first 3×5 array of locations and a second 3×5 array of locations; and
control circuitry configured to control the display, wherein, in a first mode, the control circuitry controls illumination of a plurality of individual locations of the display in the array, wherein each location conveys individual data indicative of a status of a corresponding connected automation component in communication with the automation controller, and wherein in a second mode, the control circuitry:
controls illumination of the plurality of individual locations in the first 3×5 array to combine a subset of the plurality of addressable locations to display a first amalgamated alphanumeric character; and
controls illumination of the plurality of individual locations in the second 3×5 array to combine a second subset of the plurality of addressable locations to display a second amalgamated alphanumeric character;
wherein the first and second amalgamated alphanumeric characters correspond to characters of a network address, an internet protocol (IP) address, or an error code.

9. The automation component of claim 8, the display further comprising one or more input buttons.

10. The automation component of claim 8, wherein the automation controller is disposed within an enclosure.

11. The automation component of claim 10, wherein the display device is disposed on the exterior of the enclosure.

12. The automation component of claim 8, wherein the plurality of individual locations comprise LEDs.

13. The automation component of claim 8, wherein the amalgamated alphanumeric character corresponds to the error code.

14. The automation component of claim 8, wherein the amalgamated alphanumeric character corresponds to the network address.

15. The automation component of claim 8, wherein the first and second amalgamated alphanumeric characters correspond to two digits of an IP address.

16. A method of controlling an automation component comprising:
illuminating a display having one or more individual addressable locations corresponding to a plurality of inputs and a plurality of outputs arranged in an array for display of data, wherein the array comprises first 3×5 array of locations and a second 3×5 array of locations, in a normal operation mode, wherein each of the one or more individual locations conveys individual data indicative of a status of a corresponding connected automation component in communication with an automation controller;
receiving a user input, via a user interface, instructing the automation component to enter a program mode;
receiving a user input, via the user interface, instructing the automation component to enter an input mode;
illuminating two or more individual locations in the first 3×5 array to display a first amalgamated alphanumeric character;
illuminating two or more individual locations in the second 3×5 array to display a second amalgamated alphanumeric character, wherein the first and second amalgamated alphanumeric characters correspond to characters of a network address or an internet protocol (IP) address;
selecting, via the user interface, one or more numbers that correspond to the amalgamated alphanumeric character; and
receiving a user input, via the user interface, instructing the automation component to exit the input mode.

17. The method of claim 16 wherein selecting, via the user interface, one or more numbers that correspond to the first amalgamated alphanumeric character comprises:
pressing a button one or more times to cycle through the displayed first amalgamated alphanumeric character until a desired first amalgamated alphanumeric character is reached;
pressing and holding the button for the set period of time to set the first amalgamated alphanumeric character;
pressing the button one or more times to cycle through digits until a desired second amalgamated alphanumeric character is reached; and
pressing and holding the button for the set period of time to set the second amalgamated alphanumeric character.

18. The method of claim 16 wherein the first and second amalgamated alphanumeric characters correspond to a network address.

19. The method of claim 16, wherein the first and second amalgamated alphanumeric characters correspond to two digits of an IP address.

* * * * *